Dec. 8, 1936.                H. R. McPHAIL                2,063,111
                              VALVE STRUCTURE
                             Filed June 9, 1932
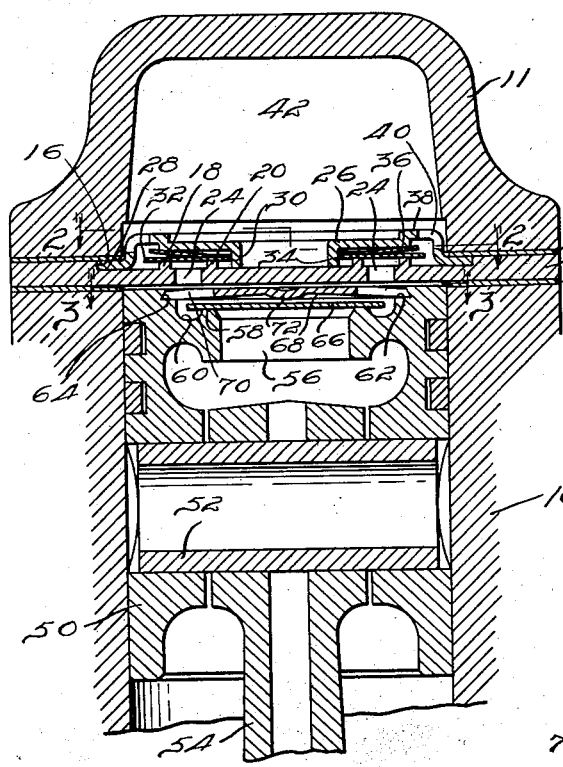
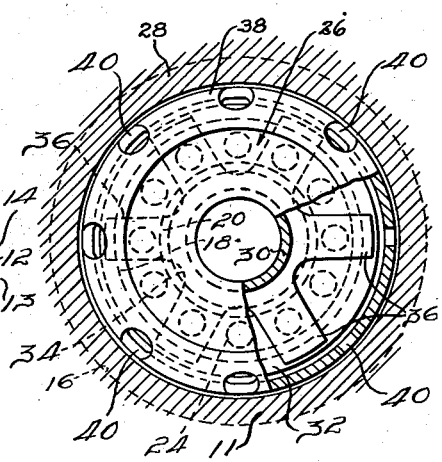
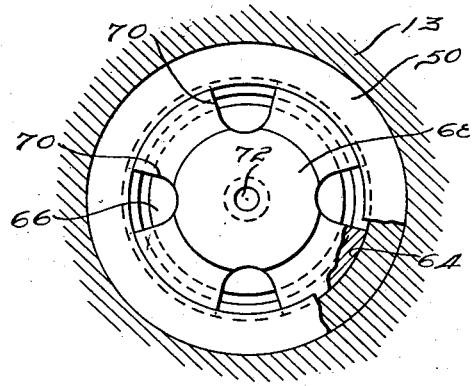
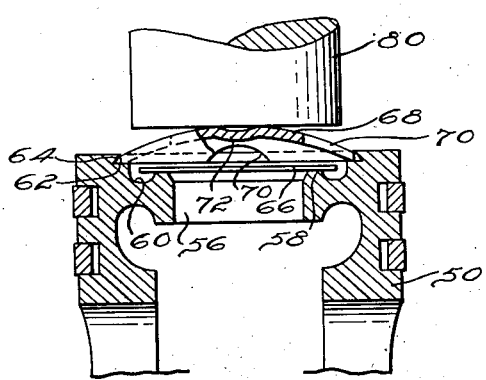
INVENTOR
HAROLD R. McPHAIL
BY
ATTORNEYS.

Patented Dec. 8, 1936

2,063,111

UNITED STATES PATENT OFFICE 2,063,111

VALVE STRUCTURE

Harold R. McPhail, Detroit, Mich., assignor, by mesne assignments, to Copeland Refrigeration Corporation, Mount Clemens, Mich., a corporation of Michigan Application June 9, 1932, Serial No. 616,287

1 Claim. (Cl. 230—190)

This invention relates to valve structures and particularly to a type of such structures that is adaptable for use in connection with compressors of refrigerating mechanism.

An object of the invention is to provide a valve structure of the type described that is simple in construction, efficient in operation and economical to produce.

Another object is to provide a novel process of producing a valve structure.

Another object is to provide a valve structure in which the movable valve element is of minimum weight.

Another object is the provision of a valve structure that will result in a minimum of noise in operating at high speed.

Another object is the provision of a valve structure in which the only movable element thereof comprises a thin metallic disc.

Another object is the provision of a valve structure that will permit a minimum amount of clearance to be maintained between the head of the piston and the valve plate in a compressor structure.

Another object is the provision of a piston having a valve mechanism of novel construction formed therein.

Another object is the provision of a piston having an opening therethrough and an annular valve seat surrounding said opening, a disc valve overlying the opening and engageable with the valve seat, and a combined stop and retaining member for the valve disc including a member expanded into interlocking engagement with a cooperating part of the piston.

Another object is the provision of an expanded valve disc stop member engageable with a cooperating part of a piston and including a central projecting portion limiting contact of the valve disc with the member to point contact only.

Another object is the provision of a novel method of securing a valve disc stop member in the piston including forming a circular recess in the head of the piston, forming a circular stop member with suitable openings therethrough for the passage of gas and of partially spherical shape, inserting the stop member in the recess and then deforming the member toward flattened condition whereby to cause its edges to be expanded into locking engagement with the edges of the recess.

Another object is the provision of a method of producing a valve structure in a piston including the steps above mentioned and the additional steps of facing off the stop member after it has been subjected to the flattening operation whereby to bring its outer surface into substantially flush relationship with the outer surface of the piston head.

The above being among the objects of the present invention, the same consists in certain novel features of construction and combinations of parts to be hereinafter described with reference to the accompanying drawing, and then claimed, having the above and other objects in view.

In the accompanying drawing, which illustrates a suitable embodiment of the present invention and in which like numerals refer to like parts throughout the several different views.

Fig. 1 is a fragmentary vertical sectional view taken through the center of a cylinder of a compressor mechanism including the suction and discharge valve structures therefor.

Fig. 2 is a horizontal sectional view taken on the line 2—2 of Fig. 1 and showing discharge valve in plan view.

Fig. 3 is a horizontal sectional view taken on the line 3—3 of Fig. 1 and illustrating the suction valve in plan view.

Fig. 4 is a more or less diagrammatic, partially sectioned, partially broken view illustrating the manner of assembling the stop member for the suction valve to the piston.

Referring to the drawing, a compressor cylinder is indicated at 10, a cylinder head at 11 and a plate 12 interposed therebetween, which plate is commonly known as the valve plate and serves in part to form the discharge valve for the compressor. Suitable gaskets such as 13 and 14 are interposed respectively between the plate 12 and the cylinder 10, and between the plate 12 and the cylinder head 11. In the instance shown the plate shown is provided with a circular recess 16 in its upper surface concentric with the cylinder 10, and the lower face of the recess is cut away to provide two annular valve seats 18 and 20, one positioned within the other and in generally spaced and concentric relation with respect thereto. A plurality of openings 24 extend through the plate 12 between the upper and lower surface thereof, and between the annular valve seats 18 and 20. Received within the recess 16 is a valve stop member indicated generally as at 26, having a marginal flanged portion 28 of substantially the same diameter and depth as the recess 16 and which is securely clamped in position therein when the cylinder head 11 is secured to the cylinder 10. As thus far described, the construction is as described and claimed in Patent No. 2,011,079, granted August 13, 1935, to John R. Replogle on co-pending application Serial No. 615,513, filed June 6, 1932.

The central portion of the member 26 is downwardly turned towards the bottom of the recess 16 to form an annular sleeve or collar 30, and surrounding the sleeve 30 and axially movably guided thereon is a valve disc 32 normally urged toward engagement with the seats 18 and 20 by means of a spring comprising, as best indicated in Fig. 2, a central annular portion 34, surrounding the sleeve 30, and radially extending finger portions 36. The member 26 immediately inwardly of the flange 28 is provided with an annular upstanding bead portion 38 providing a similar groove on the lower face of the member 26 and against the radially inner edge of which the outer ends of the fingers 36 bear in wiping relationship. The bead portion 38 of the member 26 is provided with a plurality of openings 40 therethrough for the purpose of permitting any gas forced past the valve disc 32 to flow up into the space 42 in the cylinder head 11 provided for the reception of the compressed gas. In the present construction, as distinguished from that of the above patent, the central portion of the plate recess 16 is planular, to provide a flat seat to receive the collar 30, and the location of the member 26 relative to the plate 12 is determined by the cooperating portions 16 and 28.

Within the cylinder 10, a piston 50 is reciprocably received and which may be connected by means of a wrist pin 52 and connecting rod such as 54 to a suitable crank or eccentric (not shown) driven in a conventional manner. The head of the piston is provided with a central opening 56 therethrough and is formed to provide an annular valve seat 58 surrounding such opening, the metal of the piston being cut away as at 60 in order to define the outer edge of the seat 58. Above and radially outwardly of the seat 58 the piston is cut away to provide an annular shoulder 62 bounded by an upwardly converging wall portion 64. A valve disc 66 of relatively thin nature is normally received on the seat 58, and a disc 68 secured in the head of the piston against the shoulder 62 and wall 64 prevents displacement of the valve disc 66 and limits its movement away from the seat 58. The member 68 is provided with openings or perforations therethrough, shown as best indicated in Fig. 3, in the form of cut-out portions 70 in the periphery thereof, so as to permit the escape of gas past it. It will be noted that the central portion of the member 68 is provided with a downwardly extending portion or projection 72 which offers only point contact with the valve disc 66 and thus eliminates any possibility of the valve disc adhering to it because of the viscosity of any lubricants that may be apparent on their respective surfaces. It is desired to call attention to the fact that the thickness of the material of the member 68 immediately adjacent the projection 72 is less than the thickness thereof adjacent the outer margin thereof.

In assembling the construction just described, the piston is first machined to size, the valve disc 66 is placed in position on the seat 58 and the member 68, which is initially formed with an appreciable amount of curvature into a partially spherical shape, as indicated in Fig. 4, is placed against the shoulder 62. A plunger or other suitable tool such as 80 is then brought down upon the member 68 and causes it to flatten out. In flattening out the member 68, the diameter thereof is caused to increase and the outer edge thereof, which in its initial form is cylindrical, is distorted into complementary relationship with the angular wall 64 which thus securely locks the member 68 in position in the piston head. In deforming the member 68 in this manner it is flattened to such an extent that the lowermost point of the projection 72 is brought into substantially the same plane as the shoulder 62 so that the valve disc 66 may lift the same distance at its center as it may at its edges before it comes into contact with the member 68. This permits the valve disc 66 to move upwardly bodily or it permits it to tip about one edge thereof and thus facilitates the movement thereof.

Inasmuch as the recess formed by the shoulder 62 and the angular wall 64 is of substantially the same depth as the original thickness of the member 68 and in view of the fact that the lower point on the projection 62 is brought only in the same plane as the shoulder 62, it will be apparent that the upper surface of the member 68 in its central region projects above the top surface of the piston 50. Accordingly, in order to permit a maximum reduction of the compression space above the piston during operation, the upper surface of the member 68 is machined off into flush relationship with the head of the piston 50, as indicated in Fig. 1, and this accounts for the lesser thickness of material of the member 68 adjacent the projection 72.

The result of this suction valve structure is that the piston may be brought into extremely close relationship with respect to the under side of the valve plate 12 in operation, and due to the fact that the under face of the valve plate 12 is flat throughout its area a minimum amount of clearance volume is possible of attainment with this structure. Also due to the fact that the valve 66 is the only removable part of this valve structure and due to the fact that it may be constructed of relatively thin metal, it will be apparent that little or no effort is required to lift it from its seat or to force it against the seat due to changes in pressure on opposite sides thereof, and consequently not only does it operate with great efficiency but due to light weight substantially no noise will occur due to its operation at high speed when the proper lift of the valve is provided for in proportion to the amount of gas which it must pass.

Formal changes may be made in the specific embodiment of the invention described without departing from the spirit or substance of the broad invention, the scope of which is commensurate with the appended claim.

I claim:

In a compressor, having a cylinder, a cylinder head and a plate therebetween having an opening therethrough and having a planular control portion, the combination of means on the cylinder head side of said plate forming radially spaced valve seats around said opening, a member overlying said plate, means formed adjacent the periphery of said member adapting it to be clamped between said head and plate to thereby fix said member radially of said plate, a collar on said member integral therewith projecting in abutting relation to said planular portion of said plate and positioned radially inwardly of said seats, a disc type of valve surrounding and guided for axial movement on said collar, and spring means interposed between said member and said valve constantly urging said valve toward said seats.

HAROLD R. McPHAIL.

CERTIFICATE OF CORRECTION.

Patent No. 2,063,111.                                              December 8, 1936.

HAROLD R. McPHAIL.

It is hereby certified that error appears in the printed specification of the above numbered patent requiring correction as follows: Page 2, second column, line 55, in the claim, for the word "control" read central; and that the said Letters Patent should be read with this correction therein that the same may conform to the record of the case in the Patent Office.

Signed and sealed this 23rd day of February, A. D. 1937.

Henry Van Arsdale
                                            Acting Commissioner of Patents.

(Seal)